United States Patent [19]

Jones et al.

[11] 3,887,565

[45] June 3, 1975

[54] VINCADIOLINE

[75] Inventors: William E. Jones, Indianapolis; George J. Cullinan, Trafalgar, both of Ind.

[73] Assignee: Eli Lilly and Company, Indianapolis, Ind.

[22] Filed: May 6, 1974

[21] Appl. No.: 466,939

[52] U.S. Cl. .............................. 260/287 R; 424/258
[51] Int. Cl. ........................................... C07d 33/50
[58] Field of Search ......................... 260/287 R, 236

*Primary Examiner*—Donald G. Daus
*Assistant Examiner*—D. E. Wheeler
*Attorney, Agent, or Firm*—James L. Rowe; Everet F. Smith

[57] ABSTRACT

Vincadioline, a novel indole-dihydroindole alkaloid obtained in small quantities from *Vinca Rosea*, active as an antimitotic.

3 Claims, No Drawings

VINCADIOLINE

BACKGROUND OF THE INVENTION

Several naturally-occurring alkaloids obtainable from *Vinca rosea* have been found active in the treatment of experimental malignancies in animals. Among these are leurosine (U.S. Pat. No. 3,370,057), vincaleukoblastine (vinblastine) to be referred to hereinafter as VLB (U.S. Pat. No. 3,097,137), leurosidine (vinrosidine) and leurocristine (VCR or vincristine) (both in U.S. Pat. No. 3,205,220). Two of these alkaloids, VLB and vincristine, are now marketed as drugs for the treatment of malignancies, particularly the leukemias and related diseases, in humans. Of these marketed compounds, vincristine is a most active and useful agent in the treatment of leukemias but is also the least abundant of the anti-neoplastic alkaloids of *Vinca rosea*.

SUMMARY OF THE INVENTION

This invention provides a novel indole-dihydroindole alkaloid, vincadioline, having the following physical and chemical characteristics. Vincadioline is a light tan solid melting at about 218°–220.5°C. with decomposition after recrystallization from ether. It has the following X-ray powder diffraction pattern, using filtered chromium radiation; $\lambda = 2.2896$ A.

| d in A | I/I$_1$ | d in A | I/I$_1$ |
|---|---|---|---|
| 11.40 | 10 | 4.17 | 10 |
| 9.55 | 100 −1 | 3.99 | 60 |
| 8.87 | 90) −2 | 3.71 | 20 |
| 8.63 | 90) −2 | 3.64 | 15 |
| 7.78 | 05 | 3.44 | 10 B |
| 7.57 | 60 | 3.19 | 20 |
| 7.21 | 50 | 3.05 | 05 |
| 6.00 | 40 | 2.85 | 20 |
| 5.88 | 40 | 2.78 | 10 |
| 5.58 | 70 −3 | 2.61 | 10 |
| 5.22 | 20 | 2.44 | 15 B |
| 5.08 | 20 | 2.21 | 05 B |
| 4.70 | 50 | 2.07 | 05 |
| 4.57 | 40 | 1.98 | 15 |
| 4.42 | 05 | 1.91 | 05 |
| 4.31 | 05 | | |

An infra-red spectrum of vincadioline exhibited absorption maxima at 3480 cm$^{-1}$ (indole hydrogen) and at 1745 and 1725 cm$^{-1}$ (ester carbonyls): An nmr spectrum of vincadioline had the following characteristic shifts:

| δ | H Assignment |
|---|---|
| 7.13 | C—11', 12', 13' |
| 7.53 | C—14' |
| 8.04 | N at 1' |
| 3.60 | methyl group of methyl ester at C—17' |
| 6.61 | C—14 |
| 6.09 | C—18 |
| 3.79 | methyl of C—16 methoxyl group |
| 2.70 | N-methyl at N |
| 3.79 | methyl of C—3 methyl ester |
| 9.77 | OH at C—3 |
| 5.47 | C—4 |
| 2.09 | acetate at C—4 |
| 0.80 | CH$_3$—CH$_2$ at C—5 |
| 5.85 | C—6 |
| 5.29 | C—7 |
| 2.63 | C—19 |
| 3.84 | C—3' |
| 0.91 | CH$_3$—CH$_2$ at C—4' |

The above assignments are based upon the following proposed structure for vincadioline:

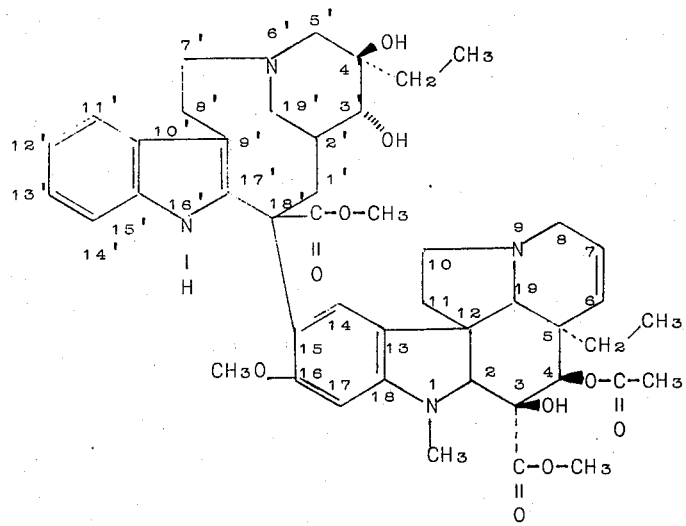

The molecular weight of vincadioline is 826 based upon a molecular ion from mass spectroscopy, $m/e = 826$, consistent with the following molecular formula: $C_{46}H_{58}N_4O_{10}$. Other mass ions present in the mass spectrogram include $m/e = 170$ and 371. The stereochemistry at C-4' is based on our inability to prepare an acetate at C-4' indicating a β-hydroxyl group (like VLB and leurocristine). The α-hydroxyl in leurosidine at C-4' readily forms an acetate under identical reaction conditions. The hydroxyl at C-3' does, however, form an acetate under these conditions which is readily detected by mass spectrocopy. An nmr spectrum of this acylated product shows a new band at δ1.85 attributable to the acetate group and a shift of the C-3' proton from δ3.84 to δ4.48.

Vincadioline forms pharmaceutically-acceptable salts with non-toxic mineral acids such as sulfuric, hydrochloric, hydrobromic, phosphoric and the like. Treatment of a solution of vincadioline in anhydrous ethanol with 1 percent ethanolic sulfuric acid yields vincadioline sulfate, an amorphous powder.

Vincadioline is prepared according to the following procedure: Leaves of plants containing crude vinca alkaloids; ie, *Catharanthus roseus* (*Vinca rosea*), are extracted with a water-immiscible solvent such as benzene. The benzene is distilled from the extract in the presence of aqueous tartaric acid. The pH of the resulting aqueous acidic extract is adjusted to pH=6 by the addition of base. Alternatively, the leaves are contacted with an aqueous acid at pH=3, and the resulting acidic layer extracted with benzene. The benzene layer is separated and discarded, and the pH of the aqueous layer adjusted to pH=6 as before. The dimeric alkaloids are then extracted from the aqueous layer into an organic solvent, customarily benzene. An optional gel exclusion filtration step can be carried out on the extracted alkaloids using a cross-linked dextran gel (sephadex G-25F), the mobile phase being a pH=3.0, 0.1M ammonium citrate buffer. A pressure of about 15 psi is employed during gel-exclusion chromatography. In this process, the dimeric alkaloid fraction containing vincristine, vinblastine, des-N-methylvinblastine, leuroformine leurosine and vinrosidine is eluted first. The dimeric alkaloids are extracted from the pH = 3 buffer by adjusting the pH to 7.0 with base and then contacting the resulting aqueous solution with a water-immiscible solvent, preferably again benzene. Evaporation of the benzene yields a residue which can be dissolved in ethanol and leurosine crystallized directly therefrom. The leurosine crystals are separated by decantation, and the supernate thus obtained is acidified to pH = 4.2 with 3 percent ehtanolic sulfuric acid to convert the remaining dimeric alkaloids to their sulfate salts which precipitate. The precipitated salts are collected and are converted to the corresponding free alkaloidal bases by standard procedures as, for example, by dissolving the salts in water, adjusting the pH to 8.0 with ammonium hydroxide and extracting the dimeric alkaloids with a water-immiscible organic solvent, preferably methylenedichloride. Evaporation of the methylenedichloride yields the mixed dimeric alkaloids which are then chromatographed at high pressure over alumina (Activity III) using a ethyl acetate-methylenedichloride-water (25:75:0.4 ) solvent system as the eluant.

Operating pressures employed have been in the range 150–350 psi. As will be understood by those skilled in the art of high-pressure chromatography, equipment is available to carry out procedures at 4000–5000 psi and pressures in the range 7500–8000 psi appear feasible. Alkaloidal separation is in general more efficient at the higher pressures. High-pressure chromatography procedures are carried out in stainless steel equipment equipped with pressure resistant fittings.

The alkaloids are eluted in the following order in this chromatographic procedure: residual leurosine, vinblastine, des-N-methylvinblastine, vincristine and vinrosidine. Identification of the dimeric alkaloid in the eluant fraction is carried out by standard procedures known to the art, as by thin layer chromatography.

After elution of the known alkaloids, there remain on the column several more polar dimeric alkaloids. These are eluted with methanol and rechromatographed until vincadioline is obtained as a separate fraction substantially free from other dimeric alkaloids present in the polar alkaloid fraction.

This invention is further illustrated by the following specific example.

EXAMPLE

Vincadioline

One-thousand five hundred kilograms of dry *Catharanthus roseus* leaf were extracted 5 times for 1-hour periods, using 28 volumes of benzene basified by the addition of 28 percent (w/v) ammonium hydroxide as the extracting medium. The benzene extracts were decanted from fibrous material, combined and filtered. The filtrate was evaporated over aqueous tartaric acid solution which was then filtered and the filtrate extracted twice at pH = 3.1 with equal volumes of benzene, and the benzene extracts separated and discarded. The pH of the filtrate was then raised to pH = 6.0 by the addition of concentrated ammonium hydroxide. The aqueous phase at pH = 6.0 was extracted 3 times with equal volumes of benzene. The benzene extracts were combined and concentrated in vacuo to yield as a residue 4695 g. of a crude alkaloid mixture (VRA). The VRA was dissolved in ethanol and the pH was adjusted to pH = 4.2 with 3 percent ethanolic sulfuric acid. Sulfates of the dimeric alkaloids formed immediately as needles, and crystallization was allowed to continue for 2 days. The crystals were separated by centrifugation, washed with ethanol and dried. The mixed sulfate salts of leurosine, vincadiolene, vinblastine and vincristine, plus a small quantity of leurosine sulfate were obtained. The salts were converted to the corresponding free bases by dissolving the salts in water, adjusting the pH of the aqueous solution to 8.0 with 14 N ammonium hydroxide and then extracting the water-in-soluble bases into methylene chloride. The methylene chloride extract was filtered, and the solvent removed by evaporation in vacuo. The resulting residue was chromatographed over 15 kg of alumina (Activity III–IV, 200 m²/g) using an ethyl acetate-methylene dichloride-water (25:75:04) solvent system as the eluant. Chromatography was carried out in a stainless steel column, 5 cm by 730 cm, at a pressure of 200–400 psi. The alumina-to-charge ratio was approximately 300 to 1. The eluate was monitored at 280 m$\mu$, and fractions were separated based upon the peaks observed in the ultraviolet profile. Fractions were identified containing predominantly leurosine, vinblastine, des-N-methylvinblastine, and leurocristine by thin layer chromatography. Three 50 g. charges of crude dimeric alkaloids (free bases from VRA sulfate) were chromatographed over this column, with the known dimeric alkaloids being sequentially eluted. Residual more polar dimeric alkaloids from the three runs were then eluted with methanol. About 3.38 g. of crude polar dimeric alkaloids were obtained. These crude alkaloids were rechromatographed over 3.5 kg. of alumina (activity III–IV) in a 2.5 cm × 730 cm column using ethyl acetate-water (98:1.8) as the mobile phase. The alumina-to-charge ratio was approximately 1000 to 1 and the chromatography was carried out at about 900 psi. The eluate was monitored as before m$\mu$. The fourth fraction thus obtained weighing 297 mg. contained vincadioline as its predominant alkaloid. Evaporation of the eluate solvent followed by recrystallization of the residue from ether yielded purified vincadioline melting at 218°–220.5° with decomposition.

As previously stated, vincadioline is an antimitotic agent with potential utility as an anti-tumor drug as shown by its ability to arrest cultured cells at the mitotic phase (metaphase) of the cell cycle without apparent effect on other stages of the cell cycle. Most of the known antitumor indole-dihydroindole (dimeric) alkaloids from *Vinca rosea* have the ability to cause metaphase arrest, including vincaleucoblastine (VLB), vincristine and leurosine. Monomeric vinca alkaloids do not possess metaphase arrest activity and are not antimitotics. Vincadioline demonstrates its metaphase arrest activity at concentration in the range $2 \times 10^{-2}$ to $2 \times 10^{-4}$ mcg./ml. as do VLB and vincristine.

We claim:
1. Vincadioline having the formula

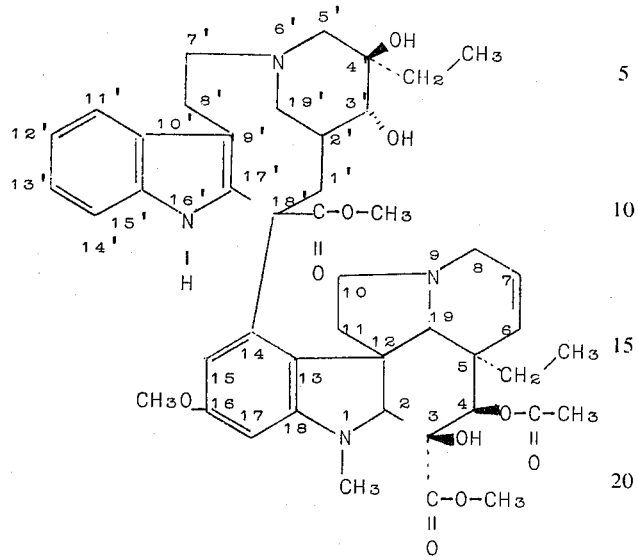

and a pharmaceutically-acceptable acid addition salt, formed with a non-toxic acid.

2. A sulfate salt of the compound of claim 1.

3. Vincadioline, an indole-dihydroindole having the following characteristics:

Melting point = 218°–220.5°C with decomposition;
X-ray powder diffraction pattern, using filtered chromium radiation; λ = 2.2896A.

| d in A | I/I$_1$ | d in A | I/I$_1$ |
|---|---|---|---|
| 11.40 | 10 | 4.17 | 10 |
| 9.55 | 100  −1 | 3.99 | 60 |
| 8.87 | 90)  −2 | 3.71 | 20 |
| 8.63 | 90)  −2 | 3.64 | 15 |
| 7.78 | 05 | 3.44 | 10 B |
| 7.57 | 60 | 3.19 | 20 |
| 7.21 | 50 | 3.05 | 05 |
| 6.00 | 40 | 2.85 | 20 |
| 5.88 | 40 | 2.78 | 10 |
| 5.58 | 70  −3 | 2.61 | 10 |
| 5.22 | 20 | 2.44 | 15 B |
| 5.08 | 20 | 2.21 | 5 B |
| 4.70 | 50 | 2.07 | 05 |
| 4.57 | 40 | 1.98 | 15 |
| 4.42 | 05 | 1.91 | 05 |
| 4.31 | 05 | | | nmr spectrum, δ at 7.13, 7.53, 8.04, 3.60, 6.61, 6.09 3.79, 2.70, 9.77, 5.47, 2.09, 0.80, 5.85, 5.29, 5.63, 3.84, 0.91;

infra-red absorption maxima at 3480, 1745 and 1725 cm$^{-1}$;

molecular weight, 826;

Empirical formula, $C_{46}H_{58}N_4O_{10}$; and

Mass ions, m/e = 826, 170, 371.

* * * * *

UNITED STATES PATENT AND TRADEMARK OFFICE
CERTIFICATE OF CORRECTION

PATENT NO. : 3,887,565
DATED : June 3, 1975
INVENTOR(S) : William E. Jones and George J. Cullinan It is certified that error appears in the above—identified patent and that said Letters Patent are hereby corrected as shown below:

Column 5, in the formula the bond in the upper ring at 18' should connect to 15 in the lower ring instead of 14 as shown.

Signed and Sealed this

Twenty-first Day of September 1976

[SEAL]

Attest:

RUTH C. MASON
*Attesting Officer*

C. MARSHALL DANN
*Commissioner of Patents and Trademarks*